Figure 1:
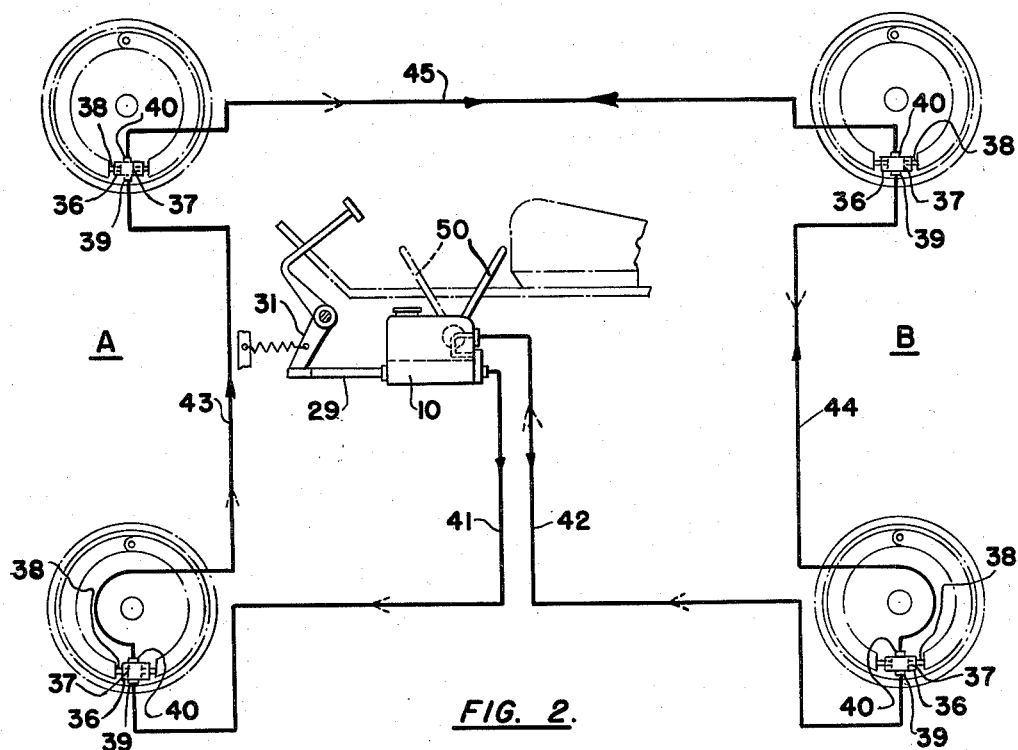

Oct. 3, 1950  H. T. SEAWELL  2,524,544
HYDRAULIC BRAKE BLEEDER SYSTEM
Filed March 2, 1948

INVENTOR.
HARRY T. SEAWELL
BY Howard J. Whelan
ATTORNEY

Patented Oct. 3, 1950

2,524,544

UNITED STATES PATENT OFFICE 2,524,544

HYDRAULIC BRAKE BLEEDER SYSTEM

Harry T. Seawell, Baltimore, Md.

Application March 2, 1948, Serial No. 12,547

3 Claims. (Cl. 60—54.5)

This invention relates to the control of brakes for vehicles and more particularly to apparatus connected with the system for hydraulically operating the brakes, especially those used on motor vehicles.

While there have been systems developed that serve to remove air bubbles from the liquid used for operating the hydraulic mechanism, for controlling the movement of the brakes of a vehicle, they have usually the disadvantage of requiring a certain amount of dismantling that is inconvenient and more or less dirty work. In addition the operation used for relieving the air takes time and a certain amount of mechanical skill. It is therefore an object of this invention to provide a piece of equipment insertable in the system as a part of the hydraulic mechanism, that may be operated by the swing of a handle or other simple manipulation, and in doing so provide a passage for the effective removal of any air bound in the system. It is also an object of the invention to provide a new and improved device for use in a hydraulically operated brake system that will avoid one or more of the disadvantages and limitations of the prior art.

Another object of the present invention is to provide a new and improved system for disengaging or diverting the liquid of a hydraulic braking system, so it cannot operate the brakes temporarily, at the will of the user, and thereby serve as a deterrent to the unauthorized use of the vehicle on which the system is mounted.

An additional object of the invention is to provide a hydraulic braking system that will be self-balancing and cleaning.

Other objects will become apparent as the invention is more fully described.

For a clearer comprehension of the invention, its objects and the principles thereof, reference is made to the appended drawing. This drawing in conjunction with the following description, detailing the particular form of the invention shown, illustrates the features and the manner in which it may be used, while the scope of the invention is emphasized in the claims.

Figure 2:
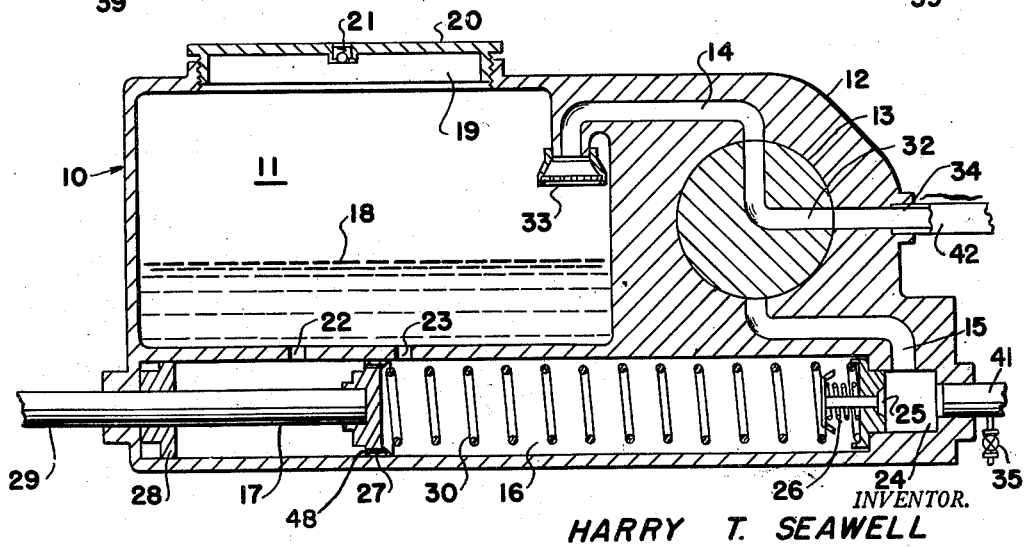

Referring to the drawing:

Figure 1 is a diagrammatic outline of a hydraulic system embodying this invention; and Figure 2 is an enlarged detail shown in section with parts broken away to disclose the internal construction of a controller unit used in this invention.

Similar reference characters pertain to the same parts throughout the drawing.

In the particular construction shown in the drawing, a controller unit consists of a housing 10 which is partitioned to include a reservoir chamber 11 for the brake liquid 18; an enclosure 12 for a two-way stop cock plug 13 with passages 14 and 15 leading therefrom, and cylinder 16 for a piston 17 to reciprocate in. The chamber 11 has a circular orifice 19 with a cap 20 screwed on it and provided with a spring and ball vent 21 in its top or uppermost portion. The cylinder 16 has a filler port 22 and compensating port 23 connecting it with the interior of the chamber 11. The ports are spaced from each other but preferably in line and are located so as to be on either side of the piston 17 when the latter is normally disposed in the cylinder. These ports allow the brake liquid 18 to flow into the cylinder in suitable sequence. The cylinder 16 has an outlet 24 in one end in which a check valve 25 is mounted and kept normally closed by a spring 26. The piston is of a quasi-dumbbell form with the end portions 27 and 28 respectively arranged so the end portion 27 will engage a coil spring 30 tending to keep the piston away from the valve 25; and the portion 28 in engagement with the rod 29 of a brake mechanism 31. Bleeders 48 are positioned in end portion 27. The passage 15 leads off from the outlet 24 so as to align with the right-angle passage 32 in the plug 13 when the latter is turned to braking position. The passage 14 has a strainer 33 in it, to collect particles of dirt. A port 34 is included in the wall of the enclosure 12 leading from the exterior to the housing. A drain valve 35 is included in a suitable location for draining the system. The system includes four similar cylinders 36 mounted on the rear wheels and front wheels in the areas noted A and B respectively. These areas are dotted in an arbitrary manner to make reference to them easier to follow. These cylinders 36 are provided with opposed pistons 37 acting on the brake levers 38 in opposite directions. The cylinders include an inlet port 39 and outlet port 40 through which the liquid 18 flows during the use of the system.

The braking system used in this invention employs tubing that connects to the controller unit and the cylinders, through the sections designated as 41, 42, 43, 44 and 45. The brake liquid flows through the tubing to operate the various parts of the brake mechanism in one case, and in a second case passes continuously in a specified direction to carry the air bubbles through the system until they are brought to the chamber 11 to be vented through the air valve 21. To facilitate this action the inlets 39 are below the outlets 40. This arrangement allows the air bubbles to rise from the inlet and pass out through the outlet in turn.

There are two operations used in the system, depending on the requirements. For general braking, the plug 13 of the stop cock is placed with the passage 15 registered with passage 32, and port 34. When the brake mechanism 31 is actuated by the user so the piston 17 is pushed against the resistance of the spring 30 it forces the liquid 18 through the outlet 24 into the section of tubing 41, while at the same time, forcing liquid bypassed through the stop cock 13 as shown in dotted outline in Figure 1, into the section 42. The liquid passes through the sections 41, 43 and 45 and meets the liquid flowing from section 42, and 44 into 45. The liquid operates the brakes in area A and area B respectively and by reason of the section 45 balances up its pressure on all the brake cylinders 36. In the other use of the system, the stop cock plug is rotated until its passage 32 is registered with the passage 14. The flow of the liquid under the movements of the pedal mechanism 31 to eliminate air bubbles is continuous in one direction, as noted by dotted arrows in Figure 1, so that sooner or later any air bubbles that may be in the system are brought around to the chamber 11 and vented through 21. When the last arrangement is used little or no pressure is exerted to operate the brake mechanism, so that if the vehicle is used unauthorizedly without changing the position of the stop cock, the vehicle will be without brakes operating. The filler port 22, compensating port 23, the valve 25 and pedal mechanism operate in conventional manner, and do not appear to require further explanation, to those skilled in the art.

The system is relatively simple, and offers a balanced braking system so that the pressure on all brakes is the same. There is more cooling area provided by the tubing to keep the brake liquid cooled even under severe braking action. Air bubbles can be positively and quickly removed out of the system. The controller unit is a neat effective device for making the system operate. Its simple operation of shifting from braking, to air bleeding through shifting the handle 50 from one use to another avoids inconvenient handling of the system or its parts. It provides a device that is readily inspected, checked or repaired and for general operation is automatic in its action. It is self cleaning and with its raised orifice 19 can take up the requirements brought about by heating or expansion of the liquid. Since however the liquid is kept unusually cool, there is not much difficulty experienced through such expansion.

While but one general form of the invention is shown in the drawings and described in the specifications, it is not desired to limit this application for patent to this particular form or in any other way otherwise than limited by the scope of the claims, as it is appreciated that other forms of construction could be made that would use the same principles and come within the scope of the appended claims.

Having thus described the invention, what is claimed is:

1. A hydraulic braking system comprising a plurality of brake-applying motors, a housing including a reservoir chamber for braking fluid and a master cylinder, a piston in said cylinder, a piston rod connected thereto and pedal mechanism connected to said piston rod, passages connecting said master cylinder and brake-applying motors serially, a manually operated valve in said housing, said housing and valve having passages to connect said reservoir chamber to the last of the serially arranged brake-applying motor when said valve is in one position and to connect said brake-applying motor to said master cylinder when said valve is in another position.

2. A hydraulic braking system as set forth in claim 1, said housing having a valve-controlled outlet at the highest level thereof, whereby air entrained in the system will be released through said outlet when said valve is in the first of said aforementioned positions.

3. A hydraulic braking system as set forth in claim 1, said housing and said cylinder having a port in common, controlled by said piston, whereby flow of the braking fluid from the reservoir chamber into said cylinder will occur during a portion of the stroke of said piston and thereafter will be cut off during the remaining of the stroke.

HARRY T. SEAWELL.

REFERENCES CITED

The following references are of record in the file of this patent:

UNITED STATES PATENTS

| Number | Name | Date |
|---|---|---|
| 1,985,812 | Banas | Dec. 25, 1934 |

FOREIGN PATENTS

| Number | Country | Date |
|---|---|---|
| 695,582 | Germany | Aug. 28, 1940 |